Patented Sept. 2, 1947

2,426,885

UNITED STATES PATENT OFFICE 2,426,885

N-SUBSTITUTED α-OXYACETAMIDES AND INSECT COMBATING COMPOSITIONS

Lowell B. Kilgore, Arlington, Va., assignor, by mesne assignments, to Lowell B. Kilgore and Helen Ford Kilgore, both of Washington, D. C.

No Drawing. Application October 9, 1942, Serial No. 461,481

28 Claims. (Cl. 167—22)

The invention described herein relates to new compositions of matter, specifically, to a new class of acetamides, and more specifically to N-substituted α-etherified acetamides. I refer to organic compounds of the general formula,

R—O—CH$_2$—CONH—R' wherein R and R' are aliphatic, aromatic, aralkyl or heterocyclic radicals.

An object of this invention is to prepare N-substituted acetamides having an ether linkage in the conjugate position with respect to the carbonyl group, that is to say, separated from the keto group by an intervening carbon atom. A further object is to prepare chemicals suitable for use as insecticides and as insectifuges. A still further object of this invention is the preparation of chemicals which are not only insect toxicants and fugients but which have suitable concomitant physical and physiological properties so as to permit their usage on human skin.

The above objects are accomplished by the following invention which consists of the hereinafter described N-substituted α-etherified acetamides.

Nitrogen substituted acetamides having an ether linkage attached to the α-carbon atom so as to be conjugated with the carbonyl group of the acetamide, are prepared according to my invention, by reacting an α-etherified acetic acid with a primary amine by the elimination of a molecule of water, shown by the formula, (1) R—O—CH$_2$COOH + R'—NH$_2$ →
R—O—CH$_2$CO—NH—R' + H—OH The same objects are also accomplished, I have discovered, by reacting an amide-forming derivative of an α-etherified acetic acid, such as the acid chloride, acid anhydride, or the ester of a volatile alcohol, with a primary amine, as follows:

(2) R—O—CH$_2$COOCH$_3$ + R'NH$_2$ →
R—O—CH$_2$CO—NH—R' + CH$_3$OH (3) R—O—CH$_2$COCl + R'NH$_2$ →
R—O—CH$_2$CO—NH—R' + HCl

Another means which I have discovered of attaining the objects of this invention comprises the preparation of the above new organic chemicals, the N-substituted acetamides, by reacting the proper N-substituted α-chloracetamide with the alkali oxide of the requisite aliphatic, aromatic, cyclic or heterocyclic alcohol with the elimination of the alkali chloride as shown by the following equation:

(4) R—ONa + ClCH$_2$CO—NH—R' →
R—O—CH$_2$CO—NH—R' + NaCl

In the foregoing equations, (1), (2), (3), (4), R and R' represent either the same or different radicals or groups.

The objects of my invention are still further realized by the incorporation of one or more of the above new organic chemicals into a lotion, cream, salve, ointment or the like, whereby such chemical or chemicals form at least three per cent by weight.

A further attainment of the objects of this invention consists in the admixture of one or more of the above N-substituted α-etherified acetamides to the extent of one tenth per cent or more by volume, with a hydrocarbon oil or base, in an emulsion wherein water comprises one phase or with a volatile liquid which spontaneously causes sufficient vapor pressure for atomization.

The various means of obtaining the objects of this invention will be more readily understood by the following showing of specific and detailed examples but it is not intended that the scope of the invention is delimited in any way by such examples.

EXAMPLE 1

*Preparation of N-cyclohexyl butoxyacetamide*

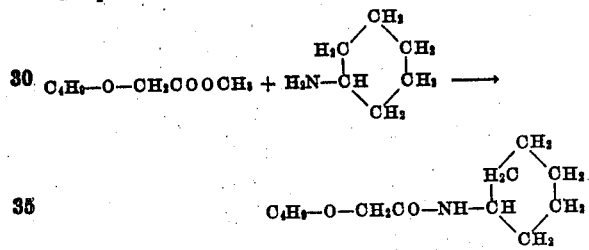

Fifty parts of methyl butoxyacetate were mixed with 35 parts of cyclohexyl amine and heated for several hours at the boiling point. The methanol of reaction was then removed by slow distillation at reduced pressure, one-half atmosphere, and the residue fractionated. A water-white, substantially odorless product was obtained, boiling at 135–40° C. at 5 millimeters pressure which was identified as N-cyclohexyl butoxyacetamide. This product analyzed: carbon, 67.1%; hydrogen, 9.4%.

EXAMPLE 2

*Preparation of N-amyl butoxyacetamide*

C$_4$H$_9$—O—CH$_2$CO—Cl + H$_2$N—C$_5$H$_{11}$ →
C$_4$H$_9$—O—CH$_2$CO—NH—C$_5$H$_{11}$

Nine parts of amyl amine were added slowly to a solution of 15 parts of butoxyacetyl chloride in equal volumes of ether and pyridine at such a rate as not to cause unreasonable refluxing of the ether. The reaction mixture, upon cooling, was diluted with several volumes of benzene and washed free of amine and the excess pyridine and fractionated. The product obtained was a water-white liquid, miscible with benzene, ligroin, ether and alcohol but immiscible in water. This new compound was identified as N-amyl butoxyacetamide and analyzed 65.9% carbon and 10.7% hydrogen.

EXAMPLE 3

Preparation of N-cyclohexyl-2,4,5,6-tetrachlorphenoxyacetamide

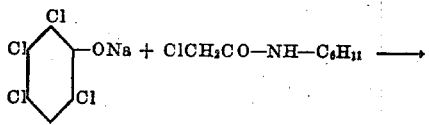

Twenty-five parts of sodium 2,4,5,6-tetrachlorphenate were treated with 18 parts of N-cyclohexyl α-chloracetamide dissolved in dry benzene and warmed to cause the reaction to take place. The reaction mixture was extracted with benzene-ether mixture, washed until neutral and fractionated. The residue solidified and was recrystallized from benzene to produce white needles melting at 105-6° C. and identified as N-cyclohexyl-2,4,5,6 - tetrachlorphenoxyacetamide.

Other compounds which I have prepared in accordance with the objects of this invention and by the methods set out above, are: N-amyl methoxyacetamide; N-cyclohexyl methoxyacetamide; N-amyl isopropoxyacetamide; N-cyclohexyl isopropoxyacetamide; N-heptyl butoxyacetamide; N-isoamyl butoxyacetamide; N-phenyl butoxyacetamide; N-benzyl butoxyacetamide; N-allyl butoxyacetamide; N-amyl octyloxyacetamide; N-cyclohexyl - β - butoxyethoxyacetamide; N-amyl β'-butoxy-β-ethoxyethoxyacetamide; N-amyl citronelloxyacetamide; N-amyl o-chlorophenoxyacetamide; N-amyl p-chlorphenoxyacetamide; N - cyclohexyl benzyloxyacetamide; N-butyl 2,4,5-trichlorphenoxyacetamide; N-heptyl 2,4,5 - trichlorphenoxyacetamide; N-cyclohexyl 2,4,5-trichlorphenoxyacetamide; N-amyl 2,4,5,6 - tetrachlorphenoxyacetamide; N-cyclohexyl α-naphthoxyacetamide and N-cyclohexyl furfuroxyacetamide.

I have discovered that the above new N-substituted α-etherified acetamides, as a class, are useful as insect toxicants and fugients. They are especially useful as the active ingredients of insect-repellent lotions, creams, ointments and powders and for general topical application. I have found that the various members of this new series of organic compounds repel such insects as the house fly, black fly, red-bug, gnat and moth even when used at low concentrations.

EXAMPLE 4

A lotion comprising 15 per cent of N-amyl butoxyacetamide, 60 per cent ethyl alcohol and 25 per cent water by volume when applied to the skin provides protection from the attack of biting flies and mosquitoes for several hours without in any way causing discomfort to the person so treated.

I have discovered that the members of the above new series of organic chemicals, the N-substituted α-etherified acetamides, possess contact insecticidal properties. This was shown by the Peet-Grady bio-assay method using house flies, which method is the official procedure for testing liquid insecticides as promulgated by the National Association of Insecticide and Disinfectant manufactures, incorporated. (Details of the method described in the "Soap Bluebook," published annually by the Mac Nair-Dorland Co., New York, N. Y.)

EXAMPLE 5

A four per cent solution of N-cyclohexyl 2,4,5,6-tetrachlorphenoxyacetamide in deodorized kerosene gave a 85 per cent mortality when tested by the Peet-Grady method, supra.

What I claim is:

1. The N-substituted n-butoxyacetamides having the general formula:

wherein R' is a radical selected from the group consisting of alkyl containing at least 4 carbon atoms, alkenyl, aralkyl, cycloalkyl, and aryl.

2. The N-amyl α-etherified acetamides having the general formula:

wherein R is a normal alkyl radical characterized by 4 to 8 carbon atoms.

3. N-amyl-α-n-butoxyacetamide.
4. N-phenyl-α-n-butoxyacetamide.
5. N-cyclohexyl-α-n-butoxyacetamide.
6. The process of combating insects which comprises subjecting them to the action of compounds of the type of the N-substituted n-butoxyacetamides having the general formula:

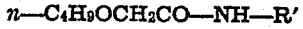

wherein R' is a radical selected from the group consisting of alkyl containing at least 4 carbon atoms, alkenyl, aralkyl, cycloalkyl, and aryl.

7. The process of combating insects which comprises subjecting them to the action of compounds of the type of the N-amyl α-etherified acetamides having the general formula:

wherein R is a normal alkyl radical characterized by 4 to 8 carbon atoms.

8. The process of combating insects which comprises subjecting them to the action of N-cyclohexyl α-n-butoxyacetamide.

9. The process of combating insects which comprises subjecting them to the action of N-amyl-α-n-butoxyacetamide.

10. The process of combating insects which comprises subjecting them to the action of N-phenyl-α-n-butoxyacetamide.

11. An insect combative composition of matter comprising as essential active ingredient an N-substituted n-butoxyacetamide, having the general formula:

wherein R' is a radical selected from the group consisting of alkyl containing at least 4 carbon atoms, alkenyl, aralkyl, cycloalkyl, and aryl; and a carrier therefor.

12. An insect combative composition of matter comprising as essential active ingredient an N-amyl-α-etherified acetamide having the general formula:

wherein R is a normal alkyl radical characterized by 4 to 8 carbon atoms; and a carrier therefor.

13. An insect combative composition of matter comprising as essential active ingredient N-cyclohexyl α-n-butoxyacetamide and a carrier therefor.

14. An insect combative composition of matter comprising as essential active ingredient N-amyl α-n-butoxyacetamide and a carrier therefor.

15. An insect combative composition of matter comprising as essential active ingredient N-phenyl α-n-butoxyacetamide and a carrier therefor.

16. The N-substituted α-etherified acetamides having the general formula:

R—O—CH$_2$CO—NH—R' wherein R is a normal alkyl radical characterized by 4 to 8 carbon atoms and R' is a radical selected from the group consisting of alkyl containing at least 4 carbon atoms, alkenyl, aralkyl, cycloalkyl and aryl.

17. The N-substituted α-etherified acetamides having the general formula:

R—O—CH$_2$CO—NHR' wherein R is a normal alkyl radical characterized by 4 to 8 carbon atoms and R' is alkyl containing at least 4 carbon atoms.

18. The N-substituted α-etherified acetamides having the general formula:

R—O—CH$_2$CO—NHR' wherein R is a normal alkyl radical characterized by 4 to 8 carbon atoms and R' is cycloalkyl.

19. The process of combating insects which comprises subjecting them to the action of N-substituted α-etherified acetamides having the general formula:

R—O—CH$_2$CO—NHR' wherein R is a normal alkyl radical characterized by 4 to 8 carbon atoms and R' is a radical selected from the group consisting of alkyl containing at least 4 carbon atoms, alkenyl, aralkyl, cycloalkyl and aryl.

20. The process of combating insects which comprises subjecting them to the action of N-substituted α-etherified acetamides having the general formula:

R—O—CH$_2$CO—NHR' wherein R is a normal alkyl radical characterized by 4 to 8 carbon atoms and R' is alkyl containing at least 4 carbon atoms.

21. The process of combating insects which comprises subjecting them to the action of α-etherified acetamides having the general formula:

R—O—CH$_2$CO—NHR' wherein R is a normal alkyl radical characterized by 4 to 8 carbon atoms and R' is cycloalkyl.

22. An insect combative composition of matter comprising as an essential active ingredient an N-substituted α-etherified acetamide having the general formula:

R—O—CH$_2$CO—NH—R' wherein R is a normal alkyl radical characterized by 4 to 8 carbon atoms and R' is a radical selected from the group consisting of alkyl containing at least 4 carbon atoms, alkenyl, aralkyl, cycloalkyl and aryl, and a carrier therefor.

23. An insect combative composition of matter comprising as an essential active ingredient an N-substituted α-etherified acetamide having the general formula:

R—O—CH$_2$CO—NH—R' wherein R is a normal alkyl radical characterized by 4 to 8 carbon atoms and R' is alkyl containing at least 4 carbon atoms and a carrier therefor.

24. An insect combative composition of matter comprising as an essential active ingredient an N-substituted α-etherified acetamide having the general formula:

R—O—CH$_2$CO—NH—R' wherein R is a normal alkyl radical characterized by 4 to 8 carbon atoms and R' is cycloalkyl and a carrier therefor.

25. An insect combative composition of matter comprising as an essential active ingredient an N-substituted α-etherified acetamide having the general formula:

R—O—CH$_2$CO—NH—R' wherein R is a normal alkyl radical characterized by 4 to 8 carbon atoms and R' is a radical selected from the group consisting of alkyl containing at least 4 carbon atoms, alkenyl, aralkyl, cycloalkyl and aryl dissolved in a kerosene type hydrocarbon.

26. An insect combative composition of matter comprising as an essential active ingredient an N-substituted α-etherified acetamide having the general formula:

R—O—CH$_2$CO—NH—R' wherein R is a normal alkyl radical characterized by 4 to 8 carbon atoms and R' is a radical selected from the group consisting of alkyl containing at least 4 carbon atoms, alkenyl, aralkyl, cycloalkyl and aryl dissolved in aqueous alcohol.

27. An insect combative composition of matter comprising N-cyclohexyl α-butoxyacetamide dissolved in a kerosene type hydrocarbon.

28. An insect combative composition of matter comprising N-cyclohexyl α-butoxyacetamide dissolved in aqueous alcohol.

LOWELL B. KILGORE.

REFERENCES CITED

The following references are of record in the file of this patent:

UNITED STATES PATENTS

| Number | Name | Date |
|---|---|---|
| 543,214 | Majert | July 25, 1895 |
| 563,009 | Bischler | June 30, 1896 |
| 1,094,296 | Bergell | Apr. 21, 1914 |
| 1,329,272 | Nelson | Jan. 27, 1920 |
| 1,963,138 | Martin et al. | June 19, 1934 |
| 2,166,120 | Bousquet | July 18, 1939 |

FOREIGN PATENTS

| Number | Country | Date |
|---|---|---|
| 96,492 | Germany | Mar. 11, 1898 |
| 102,892 | Germany | Mar. 24, 1899 |
| 180,204 | Germany | Jan. 18, 1907 |
| 98,236 | Sweden | Mar. 5, 1940 |

OTHER REFERENCES

Walther, Jr. F. Prak. Chem. (2) 65, 480 (1902).